United States Patent [19]

Haus

[11] 4,189,231
[45] Feb. 19, 1980

[54] APPARATUS FOR THE CONTINUOUS EXPOSURE OF SHEET OR STRIP COPY MATERIAL

[76] Inventor: Hans Haus, Jahnstr. 7, D-6250 Limburg, Lahn, Fed. Rep. of Germany

[21] Appl. No.: 954,746

[22] Filed: Oct. 26, 1978

[30] Foreign Application Priority Data

Oct. 26, 1977 [DE] Fed. Rep. of Germany ....... 2747911

[51] Int. Cl.² .......................................... G03B 27/30
[52] U.S. Cl. ................................................. 355/100
[58] Field of Search ............... 355/85, 86, 95, 96–100, 355/103, 113

[56] References Cited

U.S. PATENT DOCUMENTS

| 3,087,403 | 4/1963 | Herrick, Jr. | 355/100 |
| 3,589,810 | 6/1971 | Umahashi et al. | 355/100 |
| 3,877,805 | 4/1975 | Heldenbrand et al. | 355/100 |

FOREIGN PATENT DOCUMENTS 1327883  4/1963  France .................................... 355/100

Primary Examiner—Richard A. Wintercorn
Attorney, Agent, or Firm—Hamilton, Renner & Kenner

[57] ABSTRACT

Apparatus for continuously processing sheet or strip copy material fed from a horizontal plane having an endless belt conveyor for moving the copy material, a translucent rigid plate disposed in a plane inclined to the horizontal plane, a backing element gapped from and pressing the copy material against the translucent rigid plate during movement through an exposure compartment, two pairs of driving rollers disposed forwardly and rearwardly of the translucent rigid plate, the drive rollers of each of the two pairs of drive rollers having a drive gap disposed in the plane of the gap between the translucent rigid plate and the backing element, and an inclined guide strip for the copy material extending from the horizontal plane into the drive gap between the pair of drive rollers disposed forwardly of the translucent rigid plate. A continuous developing apparatus may operate on the copy material rearwardly of the exposure compartment.

12 Claims, 1 Drawing Figure

APPARATUS FOR THE CONTINUOUS EXPOSURE OF SHEET OR STRIP COPY MATERIAL

BACKGROUND OF THE INVENTION

The invention relates to an apparatus for exposing sheet or strip copy material, wherein endless belt conveyors, in frictional contact with the rear side of the copy material, together with the copy material and/or the original, fed to the apparatus in a horizontal plane, are pressed by resilient backing elements, disposed in one plane, against a stationary, planar, translucent rigid plate, the copy material and/or the original are moved through an exposure compartment, which is formed by light elements disposed on the other side of the translucent plate, and pairs of drive rollers, bearing against the upper and lower faces of the copy material and original, are disposed forwardly and rearwardly of the rigid plate, those of the rollers that are presented to the lower face of the copy material, together with at least one further roller, forming the guide and drive rollers for the belts of the conveyor, and the gap between the drive rollers being disposed in the plane of the pressure-applying surface of the translucent plate.

Apparatus of this general kind (as seen for example in Federal Republic of Germany DT-OS 1,522,850) has been developed for the purpose of solving the problem of misalignment between the original and the copy material that occurs in known continuous exposure apparatus which comprise half cylinders and endless belt guide means. This misalignment, caused by the curvature of the cylinders, has rendered such continuous exposure apparatus unsuitable for producing copies that are required to be of very precise size, such as are needed for example in measuring techniques and in the construction of ships, aircraft and automobiles. Since the copies required for the above-mentioned technical purposes are always also very long and wide, the areas of the pressure-applying elements and of the translucent plates have to be correspondingly large in such apparatus; these components are therefore positioned horizontally on very wide and long benches, having a length of 200 to 300 cm or more in the case of copy material having a width of 120 cm. For reasons associated with the static strength and the design of the pressure-applying elements, the copy material, with its coated face downward, and the underlying original can always be placed on the translucent plate and pressed downwards on to the latter by the pressure-applying elements, and exposure has therefore been carried out from below.

In another earlier proposal (Federal Republic of Germany DT-Gbm 1,976,447), the copy material and original are exposed from above while lying on a translucent rigid plate and, by means of a plurality of small-diameter rollers disposed on the upper face of the copy, are pressed against the translucent plate. The copy material and original are then moved across the plate, but the necessary planar application of pressure to the copy material and the original by means of the rollers has been difficult if not impossible to achieve.

Disadvantages common to both known types of apparatus are those of the considerable amount of space required and the very great difficulties in achieving even pressure over all of the considerable area within the exposure compartment since it is not possible, except at the edges, to prevent sagging of the large translucent plate and to prevent it from springing back when pressure is applied; furthermore, the use of plates of suitable thickness would be too expensive and would reduce the amount of light provided. The difficulty of applying uniform pressure has led to the further disadvantages of relatively great expenditure of power for driving the belt because of the large area of friction between the copy material, the original and the pressure-applying or supporting surfaces, with the associated danger of tearing when thinner papers are used, and of inclined travel of the paper web because of uneven pressure distribution under the effect of friction. It has been particularly difficult to move the leading edge of a web of copy material over the entire supporting surface since such movement can only be achieved with the aid of the forward pair of drive rollers and the belt until such time as the rear pair of drive rollers has gripped the leading edge of the web. For this purpose, it is in practice necessary to relax the force of the pressure-applying elements each time, or even to lift them from the surface of the translucent plate. Furthermore, it has of course become possible to accommodate continuous exposure apparatus comprising half-cylinders in a housing which also contains a synchronously operating connected developing apparatus disposed downstream of the exposure apparatus. This is not possible in the case of the above-mentioned known apparatus since this is prevented not only by their size but also by the special means needed for operating them.

SUMMARY OF THE INVENTION

An object of the present invention is to remove or avoid all these difficulties or disadvantages and to render it possible to combine the apparatus with a synchronously operating developing apparatus and to accommodate both in a common housing. According to the present invention, this object is achieved in that the translucent plate lies in a plane inclined from the horizontal, and a planar inclined strip for guiding the copy material and extending from the horizontal into the gap between the pair of drive rollers is disposed forwardly of the pair of drive rollers arranged forwardly of the plate in the direction of movement of the copy material. Measured in the direction of transit, the length of the translucent rigid plate can be one quarter or less of the maximum width of the copy material, and the angle of inclination of the rigid plate to the horizontal can be between 30 and 60°.

As also provided for in the invention, the resilient support element disposed in a correspondingly inclined plane, can consist in a known manner of a layer of soft elastic material, this layer or the translucent plate being adapted to be adjusted relative to each other and then secured in position. The layer of soft elastic material can be arranged on the upper surface of the web of a U-shaped box profile which can be adjusted and secured, and a U-shaped box carrier, mounted on that surface of the translucent plate that faces the copy material, can be so arranged that its legs, which extend transversely of the direction of movement of the copy material, are disposed parallel to the longitudinal edges of the translucent plate and bear thereon by way of a resilient intermediate layer. The translucent plate may be detachably connected to the box profile, and the latter may be adjustable and securable vertically and at an angle to the supporting frame of the layer of soft elastic material. The U-shaped cross-sections of the carrier and/or of the box profile may form ducts carrying currents of cold air for application to the layer of soft elastic material and to the translucent plate. Furthermore, in known manner, the apparatus can be arranged forwardly of a likewise continuously operating developing unit, in a common housing.

Because of the inclined arrangement of the translucent plate and its short length, in the direction of transit compared with its width, in conjunction with the upstream guide strip, the copy material can pass between the translucent plate and the layer of soft elastic material with little frictional resistance and without the danger of becoming misaligned. Further, this applies particularly as regards the leading edge of a web of copy material which, before being engaged by the rear pair of drive rollers, has to be pushed only by the forward pair of drive rollers and the belt into the gap formed between the translucent plate and the layer. Relaxation of the pressure-applying forces or even lifting of the mutually contacting faces of the plate and layer is thus not necessary. The inclined position of the plate and the layer virtually prevents them from bending and renders them insensitive to the downward forces due to their weight that are likely to cause sagging. It thus becomes possible to place the layer of elastic material on the surface of the web of a simple U-shaped box profile and to press the translucent plate against the elastic layer, or vice versa, by means of a U-shaped box carrier standing on its longitudinal edges. The U-shaped cross-section of these members also enables cooling air to flow in large quantities along the surfaces of the translucent plate and the layer by way of the ducts which may be formed from these U-shaped members.

Further advantages are the simplicity, rigidity and ease of fitting of such U-shaped members, and the ready accessibility of the components connected to them. Finally, the inclined position of the translucent plate and the layer of elastic material plus the possibility of introducing the copy material from a horizontal guide surface with the aid of an inclined guide strip enable the apparatus to be combined with a downstream developing apparatus in a common housing, the exposure apparatus of the invention requiring not more but considerably less space than existing exposure apparatus comprising half-cylinders. The combined exposure and developing units so obtained can be operated in the same manner as the known combined apparatus comprising half-cylinders.

DESCRIPTION OF THE DRAWING

Apparatus for the continuous processing of sheet or strip copy material according to the concepts of the present invention is shown in the attached drawing FIGURE which is a side elevational view with portions shown in section.

DESCRIPTION OF THE PREFERRED EMBODIMENT

Figure 1:
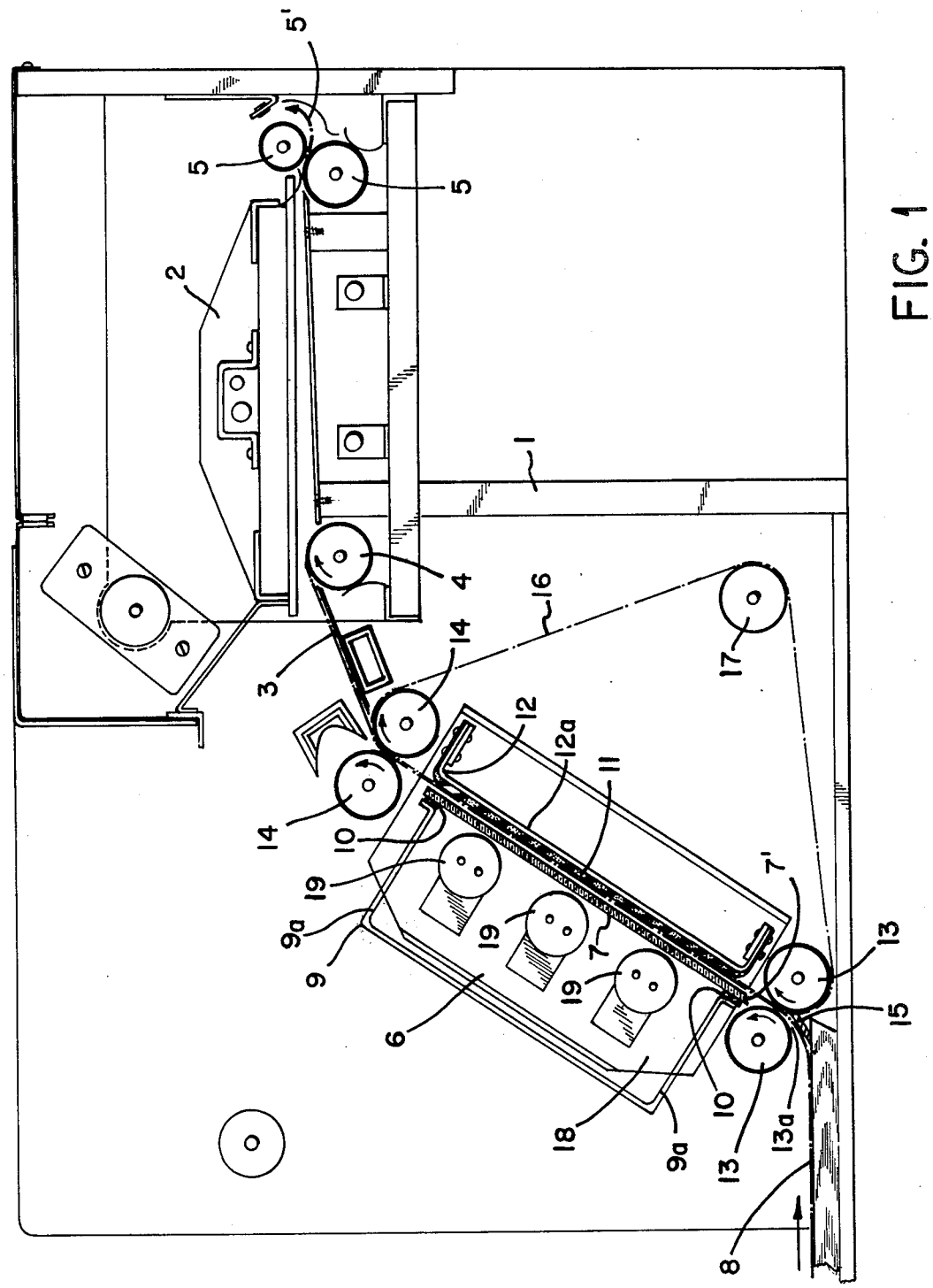

The invention will now be described in greater detail by reference to the exemplary embodiment illustrated in the attached drawing. Arranged in a common machine stand 1 is a continuous developing apparatus 2 of known construction, which passes the copy material over a guide roller 4 by way of an inclined slide plate 3. The developed copy material leaves the developing apparatus by way of a pair of drive rollers 5 in the direction indicated by the arrow 5'.

Arranged forwardly of the developing apparatus is the exposure apparatus 6. The latter comprises a translucent plate 7, which is inclined in relation to the guide surface 8, preferably at an angle of between 30° and 60°, for the feed of the copy material and which is supported in a manner not illustrated by a U-shaped box carrier 9, the two legs 9a of which stand on the longitudinal edges of the translucent plate 7, elastic shims 10 being interposed between said legs and said plate. In a manner likewise not illustrated, the U-shaped box carrier 9 together with the translucent plate 7 can be displaced and secured vertically and at an angle relative to the surface of the soft elastic layer 11 which is inclined at the same angle. This layer lies on the web 12a of a further U-shaped box profile 12 which is secured by its legs to the machine frame and which can likewise be displaced and secured vertically and, if required, at an angle in relation to the surface of the translucent plate 7. Pairs of drive rollers 13 and 14, respectively, are arranged forwardly and rearwardly of the gap formed between the translucent plate and the layer of elastic material. Arranged forwardly of the pair of drive rollers 13 is a flat inclined guide strip 15 whereby the copy material, indicated in broken lines, and optionally the copy placed thereon are moved from the horizontal guide surface 8 and introduced into the drive gap 13a formed by the drive rollers 13. Movement of the copy material is achieved by conveyor belts 16, indicated in broken lines, which are passed round the rollers 13 and 14, and in known manner, passed round a further jockey roller 17. An edge 7' of the translucent plate 7 that is presented to the drive rollers 13 is bevelled to a sharp angle as seen in the conveying direction. A carrier 18, connected to the frame 1 in a manner not shown in the drawings, carries fluorescent tubes 19 disposed transversely of the conveying direction.

I claim:

1. Apparatus for continuously processing sheet or strip copy material fed from a horizontal plane comprising, an endless belt conveyor for moving the copy material, a translucent rigid plate disposed in a plane inclined to the horizontal plane, a backing element gapped from and pressing the copy material against said translucent rigid plate during movement through an exposure compartment, two pairs of driving rollers disposed forwardly and rearwardly of said translucent rigid plate, the drive rollers of each of said two pairs of drive rollers having a drive gap disposed in the plane of the gap between said translucent rigid plate and said backing element, and an inclined guide strip for the copy material extending from the horizontal plane into said drive gap between the pair of drive rollers disposed forwardly of said translucent rigid plate.

2. Apparatus according to claim 1, wherein the length of said translucent rigid plate, measured in the direction of movement of the copy material, is not more than one-fourth the maximum width of the copy material.

3. Apparatus according to claim 1, wherein the angle of inclination of the plane of said translucent rigid plate to the horizontal plane is between 30° and 60°.

4. Apparatus according to claim 3, wherein said backing element is disposed in a plane having an angle of inclination corresponding to the angle of inclination of the plane of said translucent rigid plate and includes an elastic layer.

5. Apparatus according to claim 1, wherein said translucent rigid plate and said backing element can be relatively adjusted vertically and angularly and secured.

6. Apparatus according to claim 1, wherein said translucent rigid plate has the forward edge bevelled in the direction of movement of the copy material.

7. Apparatus according to claim 1, wherein said backing element is arranged on a web of a U-shaped box profile which can be adjustably positioned.

8. Apparatus according to claim 1, including a U-shaped carrier having two legs mounting said translucent rigid plate, said legs extending transversely of the direction of movement of the copy material and having elastic shims interposed between them and said translucent rigid plate.

9. Apparatus according to claim 8, wherein said translucent rigid plate is detachably connected to said U-shaped carrier.

10. Apparatus according to claim 8, wherein said U-shaped carrier can be displaced and secured vertically and angularly to said backing element.

11. Apparatus according to claim 1, wherein said translucent rigid plate and said backing element are mounted on supports forming ducts supplying currents of cool air to be applied to said translucent rigid plate and said backing element.

12. Apparatus according to claim 1, including continuously operating developing apparatus disposed rearwardly of the exposure compartment.

* * * * *